(No Model.)

G. L. KELSO.
HOG TROUGH.

No. 458,031. Patented Aug. 18, 1891.

Witnesses,
Robert Emmett,
Dennis Sumby

Inventor:
George L. Kelso.
By
James L. Norris.
Atty.

UNITED STATES PATENT OFFICE.

GEORGE L. KELSO, OF GALLATIN, MISSOURI.

HOG-TROUGH.

SPECIFICATION forming part of Letters Patent No. 458,031, dated August 18, 1891.

Application filed October 10, 1889. Serial No. 326,555. (No model.)

*To all whom it may concern:*

Be it known that I, GEORGE L. KELSO, a citizen of the United States, residing at Gallatin, in the county of Daviess and State of Missouri, have invented new and useful Improvements in Hog-Troughs, of which the following is a specification.

My invention relates to troughs for feeding and watering hogs and poultry; and it consists in the construction and combination of parts hereinafter described, whereby a number of hogs can be supplied with food or water without interfering with each other or wasting their food.

The invention is illustrated in the annexed drawings, in which—

Figure 1:
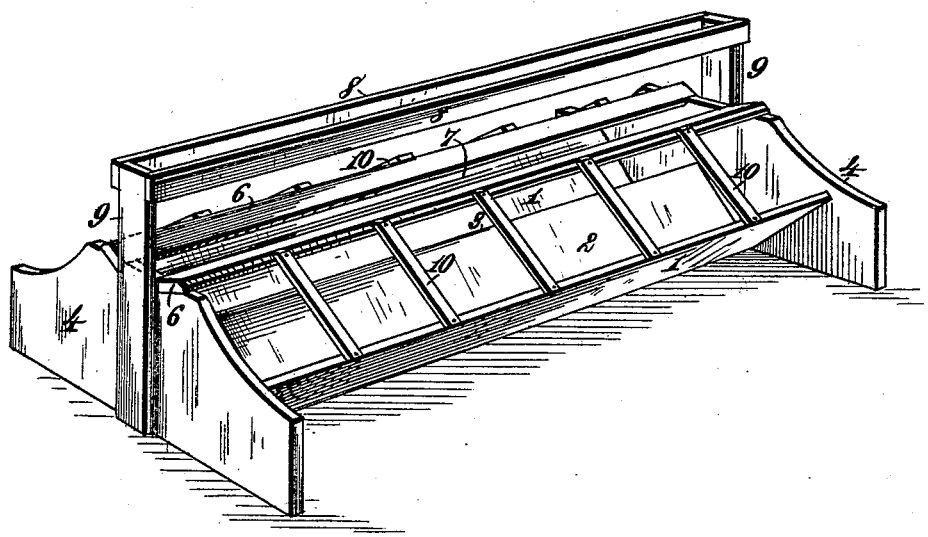
Figure 2:
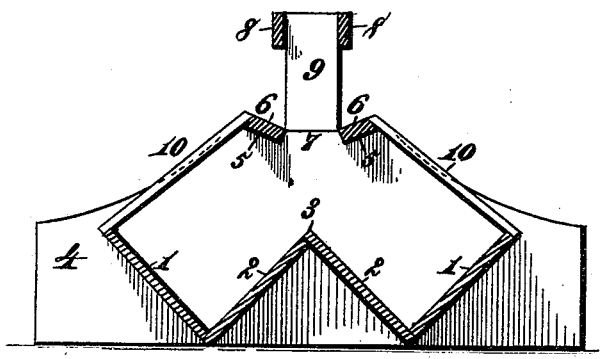

Figure 1 is a perspective view of my improved hog-trough. Fig. 2 is a vertical transverse section of the same.

The numeral 1 designates the outer inclined side pieces, and 2 the inner inclined side pieces, of a double-V-shaped trough, in which the upper edges of the two inner inclined side pieces are securely connected and form a ridge 3 between the two parallel sections of the double trough.

To the ends of the side pieces 1 and 2 are secured vertical end pieces 4, which extend from the bottom of the double trough to a suitable distance above the same. These vertical end pieces 4 also extend laterally beyond the outer inclined side pieces 1 a sufficient distance to afford a firm support for the trough and brace it so as to prevent its being overturned. The upper edge of each end piece 4 is notched at 5 on each side of a vertical line drawn through the ridge 3, and in these notches 5 are secured oblique strips or slats 6, which are inclined inward and downward toward each other and extend the entire length of the trough. The space 7 between the slats 6 may be about six inches in width or sufficient to permit a ready introduction of food or water while the animals are feeding. The food will fall into the trough along the inclined inner sides 2, and both divisions of the trough can be readily supplied. A pair of longitudinal bars 8, about four inches in width, are secured about six inches above the space 7 on opposite sides and at the top of standards 9, secured to the end pieces of the trough. These bars 8 will prevent the hogs from passing over the top of the trough, and they also serve, together with the oblique inwardly-inclined slats 6, as guides to direct the supply of feed downward onto the ridge 3, that separates the opposite sections of the double-V-shaped trough.

In order to prevent the hogs from crowding or encroaching on each other and from getting into the trough and spoiling or wasting the food, a number of inclined bars 10 are provided at suitable distances apart on opposite sides of the trough, as shown. The outer and lower ends of these inclined bars 10 rest on and are secured to the upper edges of the outer inclined side pieces 1, and the inner and upper ends of said bars rest on and are secured to the outer edges of the oblique slats 6 above the inner inclined side pieces. By means of these bars 10 each animal is confined or limited to its own place while feeding, and the smaller animals are not liable to be pushed aside or driven away by the larger animals. The bars 10 also prevent hogs from getting into the trough and dirtying the food. The trough consequently seldom needs cleaning. The laterally-extended side pieces 4 provide a firm and steady base for the trough, so that it cannot be overturned by the hogs, and the longitudinal upper bars 8 prevent them from climbing upon or across the trough.

The simple construction of the trough enables it to be furnished at a slight cost, while its durability and convenience make it a valuable aid in feeding large numbers of hogs or other animals.

What I claim as my invention is—

A hog-trough consisting of the outer and inner inclined side pieces 1 and 2, forming two parallel trough-sections separated by the ridge 3, the vertical end pieces 4, extended above said ridge and each provided in its top with inclined notches 5, located on opposite sides of a vertical line through the ridge 3, the parallel oblique slats 6, secured in said notches and inclined inward and downward with their inner edges separated along the entire length of the trough, thereby forming the inwardly-inclined sides of a longitudinal inlet 7, the standards 9 at opposite ends of said inlet, and the parallel bars 8, secured to the upper ends of said standards on opposite sides thereof, and forming, together with the slats 6, guides for directing the supply of feed downward onto the ridge that separates the trough-sections, substantially as shown and described.

In testimony whereof I have affixed my signature in presence of two witnesses.

GEORGE L. KELSO.

Witnesses:
N. B. BROWN,
MILT EWING.